Patented Dec. 19, 1939

2,183,754

UNITED STATES PATENT OFFICE 2,183,754

PROCESS OF DYEING

Paul Schlack, Berlin-Treptow, Germany, assignor to I. G. Farbenindustrie Aktiengesellschaft, Frankfort-on-the-Main, Germany, a corporation of Germany No Drawing. Application February 19, 1936, Serial No. 64,776. In Germany February 21, 1935

8 Claims. (Cl. 8—57)

My present invention relates to dyeing and printing shaped articles.

One of its objects is to provide an improved process of dyeing and printing shaped articles. Further objects will be seen from the detailed specification following hereafter.

In my co-pending applications Ser. No. 40,352 filed Sept 12, 1935 now Patent 2,131,1¼, Ser. No. 41,500 filed Sept. 20, 1935 now Patent 2,142,007, Ser. No. 47,637 filed Oct. 31, 1935 now Patent 2,130,120, Ser. No. 47,638 filed Oct. 31, 1935, Ser. No. 53,004 filed Dec. 5, 1935 now Patent 2,131,146, Ser. No. 58,259 filed Jan. 9, 1936 now Patent 2,127,236 and Ser. No. 57,524 filed Jan. 4, 1936, I have described processes for imparting to shaped materials which contain a suitable reactive group in a radical of high molecular weight a strongly basic character by aminating, hydrolizing, reducing or alkylating the material, and for dyeing such materials.

This invention is based on the observation that shaped materials, especially artificial or chemically changed natural fibrous materials, which contain groups capable of being converted into a basic condition by substitution, reduction, alkylation or hydrolysis, may be dyed and printed, particularly advantageously, if the agent which is to impart the basic character is brought into action on the goods under treatment together with the dyestuff, dyestuff-derivative or dyestuff-component. A part of the reactive groups of the material under treatment may already have been converted into the basic condition by a preliminary treatment. In the latter case there may be used the same agent which in accordance with the invention is to be used in the dyebath or printing paste. In many cases, however, it is preferable to operate with different agents as in this manner the fastness of the dyeings and the specific affinity may be further influenced in the desired direction. Obviously, the material to be treated may contain, in addition to the reactive groups suitable for conversion into strongly basic residues, previously present more or less strongly basic groups or components carrying strongly basic groups.

In this manner there are obtained in a single process with small cost dyeings of good fastness and in part a surprisingly good fastness.

It is of especial importance and value that the new process is applicable with very good practical effect, not only in the case of hydrophil or relatively hydrophil products but also in the case of hydrophobe products which are little capable of swelling. Particularly in the case of artificial materials made from cellulose derivatives which contain reactive components in the sense of the invention there are obtainable numerous new color possibilities which are of special importance for ordinary printing and discharge printing.

In view of the many sided character of the new process it is not possible to lay down general rules. The working conditions and the choice of material must depend on the chemical nature of the goods to be treated, particularly on the reactivity of these, as well as on the kind of dyeing or printing process which is to be used. Moreover, the behaviour of the individual dyestuffs, which often are very different, even when the dyestuffs contain the same groups, must be considered in the choice of the treating agent, for in a given operation there is a definite choice of dyestuff which does not offer difficulty to the expert.

Materials which are suitable for treatment by the new process of dyeing may consist wholly or in part of the following substances or mixtures thereof:

(1) Compounds which contain inorganic, or organic-inorganic ester-groups capable of being exchanged, for instance polyvinylchloracetates, and other olefinic homo- or hetero-polymerizates, which contain α-halogenacyl residues; polyglycide chloracetate; chloracetyl-cellulose, chloroxypropyl-cellulose; products of the action of epichlorhydrin with hydroxyalkylated "Novolaks"; chloracetamino-methyl derivatives of "Novolaks" and other highly molecular substances which contain amide-groups or methylene-groups having in the aromatic nucleus hydrogen atoms capable of reacting with methylolchloracetamide and analogous bodies; polymeric chloracetylaminoalkylvinyl-ether, keratin (wool) treated with epichlorhydrin, toluenesulfopolyglycide, toluenesulfo-derivatives of hydroxyethylated "Novolaks"; salts of sulfuric acid esters of oxyalkylated "Novolaks" with amines of high molecular weight, for instance dodecylamine.

(2) Oxido-compounds which are obtainable by the action of an agent which eliminates hydrogen halide on substances of high molecular weight having a halogen-hydrin group, for instance of the kind named under 1 above.

(3) Substances of high molecular weight which carry a residue exchangable for an amine residue and attached to a carbon atom by a double linking, corresponding with the general formula:

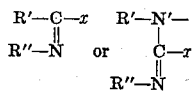

wherein R' and R" represent residues or members of a chain of relatively high molecular weight, and $x$ represents O-alkyl, S-alkyl or halogen.

For example, the products of reaction of polyglycide or an alkylene-polyamine with an excess of cyanuric chloride, in which subsequently the still remaining halogen atom is exchanged for OCH₃.

(4) Compounds of relatively high molecular weight which contain the thiourea residue, for example polythiourea obtainable by the action of an alkyl mustard oil on a long chain polyamine of the kind produced by the reaction of an alkylene diamine (ethylene diamine, propylamine diamine) on β-dichlorethylether, resinous polythiourea from "Novolaks", and methylol-compounds of unsymmetrically dialkylated thiourea with aliphatic mustard oils, for example keratin (wool) heated with methyl mustard oil.

(5) Compounds capable of being alkylated and having basic nitrogen:

Cellulose isonicotinic acid-esters; alkydals from dimethylol-compounds of homologous pyridines and polybasic acids, for example adipic acid, diglycolic acid, phthalic acid; natural protein materials, such as wool.

(6) Products of the reaction of "Novolaks" with β-halogenethylalkyl-sulfides; or products of the reaction of halogenated xylene formaldehyde resin and mercaptides.

(7) Substances having groups capable of being reduced to basic residues, for example oximes of polycarbonyl-compounds of high molecular weight, such as 4-oximinovaleroyl-polyglycide; products of addition of hydrogen peroxide to polymeric tertiary bases, for example the product of the action of hydrogen peroxide on the basic "Novolak"-ether from "phenolnovolak" and diethylamino-ethylchloride.

(8) Polyamino-derivatives in which the amino-groups have as substituents acyl-residues of organic or inorganic nature which are easily eliminated hydrolytically; or polyamines which are condensed with carbonyl compounds. Acyl residues of this kind capable of elimination are, for example, those of formic acid, trichloracetic acid, nitrous acid, dialkylsulfamide acids, and dialkylphosphoric acid. As carbonyl compounds may be named aliphatic aldehydes, ketonic acid esters and 1:3-dicarbonyl compounds.

The foregoing lists are by no means exhaustive. They only show what types of compounds are fundamentally suitable for the process.

For reaction with substances which contain groups capable of being aminated, for example groups with active halogen, or sulfuric acid ester groups or sulfonic acid ester groups or alkylene oxide groups, there may be used in the presence of the dyestuff or the dyestuff intermediate product various amines or amine derivatives. Products which are non-volatile or but little volatile are to be preferred, especially in printing. A number of amines suitable for the purpose in accordance with the degree of reactivity of the material treated are given by way of example in the following list:

Guanidine; cyclohexylamine; dimethylcyclohexylamine; unsymmetrical dimethyl-1:3-propylenediamine; tetramethylethylene-diamine; N-butylmorpholine; hydroxyethylmorpholine; 1:3-dicyclohexylamino-2-hydroxypropane; dimethylamino-acetanilide, pyridine and homologous pyridine bases, particularly those which have only limited solubility in water; pyridine-β-carboxylic acid-methyl-glycolester; pyridine-β-carboxylic acid-β-diethylaminoethylester in the form of the acetate; imidazoles, imidazolines, pyrazoles and other heterocyclic compounds capable of being easily alkylated, for example, hexamethylenetetramine.

Instead of such amines or amine derivatives there may also be used in many cases with special advantage amine derivatives which are substituted or condensed at the basic nitrogen in a form easily eliminated during the dyeing; or amine derivatives having pentavalent nitrogen which easily passes into trivalent nitrogen, for instance by heating or steaming or by the action of a reducing agent. In this manner the solubility of the auxiliary agent in the dyeing liquor or printing paste or its affinity for the goods under treatment may be influenced and the volatility counteracted. Examples are amine-oxides; quaternary ammonium salts; condensation products of primary amines, mono-primary diamines and other amines which contain free amino-hydrogen with carbonyl compounds, such as formaldehyde, acetylacetone, acetic aceto esters, dihydro-resorcinol or the like. When aldehyde amines are present in the printing paste, the addition of amides, such as acetamide, urethane, urea or a urea derivative, a guanidine salt or another agent which at ordinary or at a raised temperature binds aldehyde, may be useful.

When the products used for the amination impart to the dye-bath a strongly alkaline reaction it is preferable when dyeing with most of the acid dyestuffs to add acid or materials which yield acid, for example ammonium salts, in progressive stages of the dyeing, or to add such substances to the printing paste, whereby in either case acid is gradually produced. In this manner an essentially better utilization of the dyestuff is obtained. When using tertiary amines which are comparatively completely consumed, or, in the case of feeble tertiary amines which react with alkylating groups to produce basic quaternary ammonium groups, such an addition may frequently be omitted without influencing the utilization of the dyestuff. In the case of very feeble bases, for example pyridine bases, acids may be unobjectionably present from the beginning because the salts, particularly those of weak acids, are to a great extent or completely hydrolytically decomposed. This addition of acid has the advantage that the accompanying yellowing is avoided or at all events strongly suppressed. In order to counteract the yellowing phenomenon which, in the case of soft color tints may be destructive, even when working in neutral or alkaline medium it is useful to add a reducing agent or an anti-oxygen or both, for example sodium hydrosulfite, "Rongalite", stannous chloride, stannous sulfocyanide, stannous acetate, mercaptan or a mercaptoic acid, mannite, an aldehyde, a sulfite or thiosulfate, insofar as such substances can be mixed with the dyestuff or the dyestuff derivative and the active substance (aminating agent) without disadvantage, which must be tested from case to case.

In the case of material which contains freely reactive alkylating inorganic or organic or inorganic-organic ester-groups the reaction with thiourea is particularly advantageous. There is produced in this case an isothiourea ether or a salt thereof, which exchanges its anion easily for the anion of the dyestuff acid. Since the thioureas are not volatile or comparatively slightly volatile they are particularly applicable in printing. To be preferred are those thioureas which are at least twice symmetrically substituted and therefore do not contain free primary amide-groups. In this case a secondary decomposition into mercaptan and cyanamide and other secondary products, possibly having a coloring effect, is excluded.

The thioureas may generally contain any desired substituents, for instance groups which improve the solubility in the treating liquor or the printing paste or the affinity to the material dyed or printed; or even groups which increase the basic effect. The following bodies may be named as examples:

Symmetrical dimethylthiourea, ethylene-thiourea, N-hydroxyethyl-ethylenethiourea and acetic acid esters of these; 1:3-propylenethiourea, N-methylthiourea-N'-acetic acid, N-methylthiourea-N'-ethanesulfonic acid; N-methyl-N'-β-diethylaminoethyl-thiourea, its methoiodide or dimethylsulfate; symmetrical dicyclohexylthiourea, N-dodecyl-N'-methylthiourea.

Also thioureas with aromatic or substituted aromatic residues are applicable. The thioureas may also be used in the form of derivatives which can easily be split, for instance in the form of acyl-derivatives or of condensation products with carbonyl-compounds, for instance the salts of the condensation product from thiourea with a dicarboxylic acid anhydride or the condensation product of a substituted thiourea with formaldehyde, acetylacetone, and acetoacetic ester, glyoxylic acid, pyrotartaric acid, benzaldehyde sulfonic acid. These substances may be used in the presence of an agent which, especially at a high temperature, accelerates the decomposition and/or binds the products of decomposition which do not react with the material to be dyed or printed, for instance in presence of alkali acetate, alkali phosphate, a sulfite, urea, a guanidine salt or a hydroxylamine salt.

Thiourea or thiourea-derivatives which contain acid groups may be used in the form of the free acids or in the form of salts according to circumstances. Advantageously those salts are used which favour the penetration into or the adhesion to the material being dyed or printed, for example salts with amines, particularly those which are of capillary active character. The affinity to the material can be increased, particularly in the case of cellulose ester material, by forming a salt with certain amines. Suitable bases for this purpose are guanidine, morpholine, and cyclohexylamine. Even when no acid-groups are present the thiourea may be combined with an amine or another analogously acting substance, whereby in many cases a more than additive effect is produced.

The thioureas are compatible with almost all dyestuffs coming into question and may be used with like effect in neutral, acid or alkaline medium, with or without the addition of a salt, for example sodium acetate or sodium sulfate. They behave in this connection similarly to the feeble tertiary bases of the pyridine type but have the advantage that they show little or no tendency to yellowing.

In the case of substances with groups capable of being alkylated the choice of the alkylating agent is dependent on the speed of reaction of the material to be dyed or printed; on its physical behaviour and on the dyeing or printing process to be used. In the case of agents soluble more or less freely in water the liquor ratio is of first importance. Those products are naturally preferred which permit free reaction and a rapid operation. In using chlorine or bromine compounds the speed of reaction may be accelerated by the addition of a small proportion of an iodide, for instance sodium iodide, tetramethylammonium iodide, dodecyltrimethylammonium iodide. For example, the following alkylating agents may be named:

Chloracetic acid, chloracetylmethyl-glycol, glycol-dichloracetate, glycerine trichloracetate, chloracetanilide, monochlorhydrin, dichlorhydrin, chlorhydroxypropyltrimethylammonium chloride, tetrachlorhydroxypropylammonium chloride, hexachlorhydroxypropylethylenediammonium chloride, dichlorhydroxypropyl-cyclohexylamine acetate, para-nitrobenzylchloride, dichloromethyl-meta-xylene, para-nitro-benzyltrimethylammonium chloride or -iodide, chlorethyl-diethylamine, dimethyl-sulfate, toluene-sulfonic acid-methyl ester, naphthalene sulfonic acid-methyl ester, parachlorophenoxypropene oxide, β-γ-oxido-propyltrimethylammonium-methosulfate.

The action of the alkylating agent may, so far as is necessary for the dyeing or allowable with respect to the goods dyed, be effected also in presence of a buffer substance or a substance of alkaline action or capable of binding acid, for example in presence of calcium hydroxide, sodium phosphate, an alkali salt of an amino-acid, particularly a tertiary amino-acid, sodium acetate, magnesium acetate, magnesium sulfate, magnesium oxide, calcium carbonate urea; further, in presence of specific substances which bind hydrogen halide, for example an alkylene oxide, preferably one which is not noticeably volatile under the conditions of working.

For reducing non-basic nitrogen-groups present in the material to basic groups, there come into question all reducing agents capable of application in the presence of dyestuffs or dyestuff derivatives which are stable in presence of a reducing agent, namely dyestuffs like Quinoline Yellow S, (Schultz Farbstofftabellen 7th edition, vol. I, No. 918), Azo-Carmine BX, (Schultz Farbstofftabellen 7th edition, vol. I, No. 948), Wool Fast Blue GL (Schultz Farbstofftabellen 7th edition, vol. I, No. 974), or Indigosols. According to the conditions under which the dyeing or printing is conducted and the behaviour of the fibrous material, the reducing agent used may be a sulfite, hydrosulfite, sodium formaldehyde-sulfoxylate, or zinc formaldehyde-sulfoxylate, stannous chloride, stannous cyanide, stannous acetate, a titanous salt or zinc dust. This kind of process is particularly useful for local effects.

In the case of materials which contain substances becoming basic by hydrolysis, it is useful in the dyeing or printing with acid dyestuffs to increase the proportion of acid in situ or to add substances which decompose with the production of strong acid, for example a formic acid ester, a halogen hydrin or a sulfochloride. In the case of compounds in which the basic groups are condensed with carbonyl compounds generally more mild agents are used. Here, particularly suitable are substances which bind chemically the carbonyl compounds which become liberated.

The process is specially applicable to dyeing with acid dyestuffs, dyestuff derivatives or dyestuff components containing sulfo- or carboxyl-groups. It is not, however, limited thereto. In the case of products having a cellulose derivative basis, particularly acetate artificial silk, having components suitable for the process of the invention, not only is the affinity to dyeing substances of an acid nature increased or frequently first developed but there is improved also the affinity to the usual dispersion dyestuffs to a not inconsiderable extent. This is particularly noticeable in products with moderate adsorptive capacity, which for the production of deeper tints must be dyed at an undesirably high temperature (over 80° C.). By dyeing with simultaneous amination in accordance with the process of this invention, it is possible to depress the dyeing temperature to a considerable extent and in printing to work with a relatively short steaming period. This effect is not to be referred to the swelling action of the auxiliary agent but is connected in specific manner with the amidation of the fiber.

Dyeings with amino-anthraquinone, for example with 1:4-di-monomethylamino-anthraquinone, produced in accordance with this invention may show an essentially improved fastness to industrial acid gases.

The dyeing and printing operations may be facilitated by the rational use of known dyeing adjuvants and may also be made more certain thereby. Thus, there is to be recommended that together with subsequently added acid in dyeing in presence of an amine there should be added an equalizing agent stable to acid, for example sodium oleylmethyltaurine. A swelling agent which is a usual addition in printing may also be added to the dye-bath, for instance a sulfocyanide, a salicylate, diacetonealcohol, ethyl- or butyl-glycol, phenol or resorcinol.

The following examples illustrate the invention:

Example 1.—A satin fabric made from acetate artificial silk which to the extent of 90 per cent consists of acetyl-cellulose with an acetic acid content of 54 per cent and to the extent of 10 per cent of acetone soluble polyvinyl chloracetate, is dyed in a liquor ratio of 1:40 in presence of 10 per cent of ethylene thiourea with 3 per cent of Brilliant Sulfoflavin FF (Schultz Farbstofftabellen 7th edition, vol. II, page 40), for 1 hour at 75° C., whereby the bath is practically exhausted. There is obtained a very clear powerful yellow dyeing of relatively good fastness to light. Without ethylenethiourea the fabric is only feebly tinted. In like manner, also with thorough exhaustion of the bath, one can dye with 3 per cent of 3-hydroxyquinophthalonesulfonic acid or with 6 per cent of Alizarine Direct Blue A (Schultz Farbstofftabellen 7th edition, vol. II, page 9). If necessary the exhaustion can be completed by addition of ammonium chloride or sodium sulfate. The dyeing with 6 per cent of Alizarine Direct Blue A is unobjectionably fast to water. A dyeing produced with the same dye with the addition of 50 per cent of ammonium chloride considerably weaker coloring bleeds very much in water.

The fabric containing polyvinylchloracetate is distinguished in its general habit and also in its dyeing behaviour practically not at all from an analogous fabric or pure cellulose. The chemical stability is good. One has therefore the free choice of dyeing the fabric containing polyvinyl chloracetate in the usual manner for dyeing acetate artificial silk, or of dyeing in presence of one of the aforesaid aminating agents with dyestuffs which are not otherwise applicable. The same applies to printing. This adaptability varying needs proves a great advantage.

Example 2.—A fabric consisting of acetate artificial silk which contains 12.5 per cent of a partially saponified, preferably in the vinylacetate group, mixed polymerizate from 1 mol. vinylacetate and 4 mol. vinyl-chloracetate is dyed with 4 per cent of Orange II (Schultz Farbstofftabellen 7th edition, vol. I, No. 189), in presence of 10 per cent of pyridine bases of boiling point 125-150° C. for 1 hour at 75° C. The bath is thoroughly exhausted. There is obtained a powerful red orange. The same result is produced if ethylene thiourea is substituted for the pyridine bases.

Example 3.—The same fabric as is used in Example 1 is dyed in a liquor ratio of 1:25 in presence of 3 per cent of pyridine bases of boiling point 125-150° C. in 2 per cent of acetic acid with 2 per cent of Alizarine Direct Blue A for 1 hour at 65-75° C. There is obtained a clear pure blue, while the dyeing in absence of acid appears broken towards green in consequence of a slight yellowing.

Example 4.—A cellulose ether artificial silk which, in addition to cellulose ethylether having an ethoxy content of 42 per cent, contains 10 per cent of the product of reaction of polyvinyl chloracetate with dimethylamine which has been after-treated with hydrogen peroxide and glacial acetic acid, is printed with an acetate silk dyestuff capable of being discharged and then with a discharge paste which contains a dyestuff stable to an acid discharge, for example Quinoline Yellow (Schultz Farbstofftabellen 7th edition, vol. I, page 392). There is obtained a powerful brilliant discharge effect. By a discharge agent (soluble formaldehyde - zinc - sulfoxylate) the pentavalent amino-oxide-groups are reduced to strongly basic tertiary amino-groups.

Example 5.—An acetate artificial silk obtained by the dry spinning of a solution in methylene chloride and alcohol and consisting of 80 parts of cellulose acetate of 54 per cent acetic acid content and 20 parts of cellulose isonicotinic acid ester, made as described in British specification No. 347,451, is dyed in presence of levigated chalk with a dispersion of 10 per cent of toluene-methyl ester-sulfonic acid and 3 per cent of Alizarine Direct Blue A for 1 hour at 50-75° C. The bath is practically exhausted. Preferably, the toluenesulfonic acid ester mixed with the emulsifying agent is added to the bath in portions. For the better utilization of the dyestuff there may be added to the bath also sodium sulfate in proportion up to 50 per cent of the fiber. In like manner the silk may be printed with acid-dyestuffs in which case glycol-dichloracetate is substituted for the toluene-sulfonic acid ester.

Example 6.—A wool material which has been treated for 14 hours at 75 per cent relative atmospheric moisture and at 50° C. with 25 per cent of epichlorhydrin vapour, is printed with an acid dyestuff, for instance 3 per cent of Brilliant Fulling Blue B (Schultz Farbstofftabellen 7th edition, vol. II, page 41), or 5 per cent of Nerol TL extra (Schultz Farbstofftabellen Supplemental vol., page 114), in presence of ethylenethiourea. There is obtained a very deep full print.

Example 7.—A wool fabric which has been impregnated with a 1/5 normal solution of tetrachlorohydroxypropylammonium chloride and, after centrifuging, has been heated for 16 hours at 80° C., is dyed in presence of 7.5 per cent of pyridine bases of boiling point 125-150° C. in a neutral bath with 4 per cent of Alizarine Direct Blue A. The dyestuff is fixed by the fiber even far below the boiling temperature.

The dyestuffs named in Examples 1, 2 and 3 may be exchanged for any of the following:

Quinoline Yellow S extra (Schultz Farbstofftabellen 7th edition, vol. I, page 392),
Naphthol Yellow S (Schultz Farbstofftabellen 7th edition, vol. I, page 13),
Wool Fast Yellow 3 G (Schultz Farbstofftabellen 7th edition, vol. II, page 229),
Palatine Light Yellow R (Schultz Farbstofftabellen 7th edition, vol. II, page 170),
Azoflavin FFN (Schultz Farbstofftabellen 7th edition, supplemental vol., page 69),
Mordant Yellow 3 R (Schultz Farbstofftabellen 7th edition, vol. I, page 39),
Metanil Yellow extra (Schultz Farbstofftabellen 7th edition, vol. I, page 78),
Orange RO (Schultz Farbstofftabellen 7th edition, vol. I, page 89),
Orange IV (Schultz Farbstofftabellen 7th edition, vol. I, page 81),
Sorbic Red G (Schultz Farbstofftabellen 7th edition, vol. I, page 56),
Fast Red AV (Schultz Farbstofftabellen 7th edition, vol. I, page 92),
Alizarine Direct Violet ER and EBB (Schultz Farbstofftabellen 7th edition, vol. II, page 10),
Wool Fast Blue BL (Schultz Farbstofftabellen 7th edition, vol. I, page 420),
Alkali Violet 6 B (Schultz Farbstofftabellen 7th edition, vol. I, page 340),
Alizarine-uranol R and BB (Schultz Farbstofftabellen 7th edition, vol. I, page 536),
Alizarine Brilliant Pure Blue R (Schultz Farbstofftabellen 7th edition, vol. II, page 8),
Alizarine Direct Blue A3G (Schultz Farbstofftabellen 7th edition, vol. II, page 9),
Alizarine-cyanine Green G (Schultz Farbstofftabellen 7th edition, vol. II, page 532),
Green Alizarine-dyestuffs according to German Patent 612,870.

This enumeration can be considerably extended. It merely serves to show that the application of the process to material of cellulose derivative basis is not limited to a few products, even if many of the usual acid dyestuffs, in consequence of too high a molecular weight, too strong a sulfonation or some other ground are excluded from the process.

*Example 8.*—Acetate artificial silk containing 10 per cent of polyvinylchloracetate is dyed with Orange II in the presence of 10 per cent of dimethylaniline in a bath of 30 parts by volume for 2 hours at 75° C. There is obtained a rather strong coloring while acetate silk made from the same cellulose acetate but without the addition of polyvinylchloracetate is only weakly dyed in spite of the presence of the amine.

*Example 9.*—An acetate artificial silk consisting of 77.5 parts of cellulose acetate with a content of 53.4 per cent of acetic acid and 12.5 parts of polyvinylchloracetate is dyed with 4 per cent of Orange II in the presence of 10 per cent of allylthiosemicarbazide in a bath of 25 parts by volume for 2 hours at 60–75° C. A strong coloring is obtained.

*Example 10.*—The same artificial silk as described in Example 9 is dyed with 3 per cent of Fast Red AV and 6 per cent of isoquinoline dispersed with oleylpolyglycol for 2 hours at 50 to 75° C.

What I claim is:

1. In a process of dyeing a fibrous textile material, selected from the group consisting of those which contain non-basic radicals capable of being converted into basic condition and those which contain basic radicals capable of being converted into more strongly basic condition, by treatment with a medium containing a dyestuff having an acid group, the improvement which consists in adding to said medium a substance which will produce at least one of the above mentioned conversions of such of the aforesaid radicals as are contained in said textile material.

2. In a process of dyeing a textile material, which contains non-basic radicals capable of being converted into a basic condition, by treatment in a medium containing a dyestuff having an acid group, the improvement which consists in adding to the said medium a compound of the group consisting of amines and derivatives of amines.

3. In a process of dyeing a textile material, which contains non-basic radicals capable of being converted into a basic condition, by treatment in a medium containing a dyestuff having an acid group, the improvement which consists in adding to the said medium a compound of the group consisting of thioureas and derivatives of thioureas.

4. In a process of dyeing a textile material which contains basic radicals capable of being converted into a more strongly basic condition, by treatment in a medium containing a dyestuff having an acid group, the improvement which consists in adding to said medium an alkylating agent.

5. In a process of dyeing acetate artificial silk, consisting of cellulose acetate and polyvinyl chloracetate, by treatment in a bath containing an acid dyestuff, the improvement which consists in adding to the dyebath a tertiary amine.

6. In a process of dyeing artificial fibers from organic cellulose derivatives comprising a comparatively small amount of a polyvinyl resin containing an inorganic ester group by treatment in a bath containing a dyestuff having an acid group, the improvement which consists in adding to the dye-bath a tertiary amine.

7. In a process of dyeing acetate artificial silk consisting of cellulose acetate and polyvinylchloracetate by treatment in a bath containing a dyestuff having an acid group, the improvement which consists in adding to the dye-bath a weakly basic tertiary amine.

8. In a process of dyeing acetate artificial silk consisting of cellulose acetate and polyvinylchloracetate by treatment in a bath containing a dyestuff having an acid group, the improvement which consists in adding to the dye-bath a weakly tertiary amine of the pyridine series.

PAUL SCHLACK.